United States Patent [19]
Watakabe

[11] 4,129,684
[45] Dec. 12, 1978

[54] FLOAT TYPE METAL-AIR BATTERY

[75] Inventor: Yuichi Watakabe, Yokohama, Japan

[73] Assignee: Furukawa Denchi Kabushiki Kaisha, Yokohama, Japan

[21] Appl. No.: 876,451

[22] Filed: Feb. 9, 1978

[30] Foreign Application Priority Data

Feb. 15, 1977 [JP] Japan .................. 52-1707152

[51] Int. Cl.² .......................................... H01M 8/20
[52] U.S. Cl. ................................................ 429/27
[58] Field of Search ............. 429/27, 34, 38, 72, 429/118, 119

[56] References Cited

U.S. PATENT DOCUMENTS

| | | | |
|---|---|---|---|
| 2,437,422 | 3/1948 | Dunham | 429/27 |
| 3,843,413 | 10/1974 | Schmidt | 429/27 |
| 3,871,920 | 3/1975 | Grebier et al. | 429/27 |

*Primary Examiner*—Anthony Skapars
*Attorney, Agent, or Firm*—Pope, Ballard, Shepard & Fowle

[57] ABSTRACT

A float type metal-air battery having an air chamber covered by an air pervious, water repellent membrane is provided with a protector lid to enclose the membrane. The lid includes at least one air intake opening. Shelter plates are interposed between the openings and the membrane to thereby prevent water entering through the openings from contacting a substantial portion of the membrane.

5 Claims, 4 Drawing Figures

FLOAT TYPE METAL-AIR BATTERY

This invention relates to a metal-air battery used by being floated especially on the sea surface or the like, and more specifically is directed to a float type metal-air battery operable by being floated on the sea water, fresh water or the like and suitable in use as a drifting beacon light by lightening a lamp connected thereof.

A conventional metal-air battery using the sea water as electrolyte and used by being floated on the sea surface is so constructed that an opening portion at the upper surface of an air chamber thereof is covered with an air pervious and water repellent membrane of teflon or the like, so that sea water or the like does not go into the air chamber, but the same is so defective that in the case where the same is used for a long time the air pervious and water repellent membrane is deteriorated in its air pervious property by the sea water or the like and a discharging characteristic of the battery is worsened.

This invention has for its object to provide a battery which is free from these conventional defects and can exhibit a good discharging characteristic for a long period of time, and according to this invention it is characterized in that an air intake opening 4 is provided above an air pervious and water repellent membrane 2 covering an upper surface of an air chamber 1, and a shelter plate 5 is provided between the air intake opening 4 and the air pervious and water repellent membrane 2.

One embodying example of this invention will now be explained with reference to the accompanying drawings.

BRIEF DESCRIPTION OF DRAWINGS

In the accompanying drawings forming a part of the specification, and in which like numerals are employed to designate like parts throughout the same.

DETAILED DESCRIPTION

Figure 1:
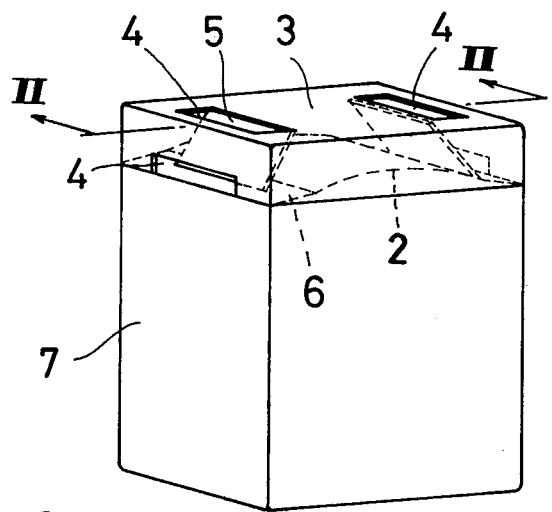
FIG. 1 is a perspective view of one embodying example of this invention.
Figure 2:
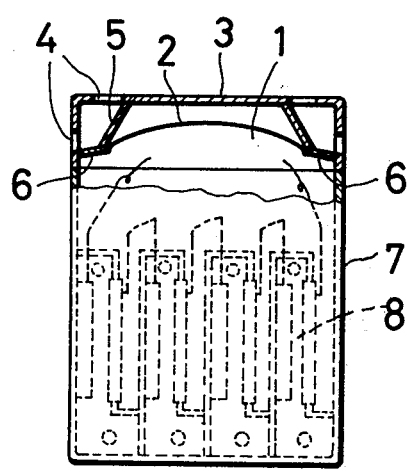
FIG. 2 is a sectional view of an essential portion, taken along the line II—II in FIG. 1, of the same.

Referring to the drawings, numeral 1 denotes an air chamber of a float type metal-air battery, numeral 2 denotes an air pervious and water repellent membrane made of teflon or the like for covering an upper surface of the air chamber 1, numeral 3 denotes a sectionally U shaped protective covering lid provided above the same, numeral 4 denotes air intake openings made respectively in both side walls of and in both side areas of a top wall of the protective covering lid 3, numeral 5 denotes a shelter plate, numeral 6 denotes holding plates securing both side ends of the air pervious and water repellent membrane 2, and numeral 7 denotes a metal-air battery container in which plural cells, each of which is composed of a combination of an air electrode comprising carbon and a metal electrode comprising magnesium, are set in a line.

The air chamber 1 is designed to be used as a single air chamber common to the respective cells 8. The air pervious and water repellent membrane 2 covering the upper surface of the air chamber 1 is formed into a mountain-shaped one to cut off water for preventing sea water and others from adhering thereto and stagnating therein and is reinforced from inside with a wire net or the like (not shown). The membrane 2 is, at its all side edges, fixed air-tight to the inner wall surface of the container 7 so that sea water or others may not pass into the air chamber 1 therethrough and also is fixed, at its both side ends, by the holding plates 6,6 each being slightly inclined outwards. The U-shaped protective covering lid 3 is provided above the membrane 2 as mentioned above and the peripheral edge thereof is fixed by an adhesive agent to the peripheral upper edge of the container 7, and the lower ends of both side walls thereof and both side portions of the top wall thereof are opened respectively to be provided with the respective air intake openings 4. As for the air intake openings 4 made in the protective covering lid 3, it is preferable, in view of prevention against invasion of sea water caused by side waves, that those made in the upper surface thereof are broader and those made in the side surface thereof are narrower. The air intake openings 4 made in the side surface can serve not only as openings for intaking air, but also as openings for discharging sea water and others entered through any air intake openings 4, and therefore it is preferable that the lower end of the opening 4 comes adjacent to the upper surface of the holding plate 6.

The shelter plates 5 are so provided that each thereof is extended to bridge between each holding plate 6 and each of such inner side edges of the air intake openings 4,4 made in the upper surface of the protective covering lid 3 that face each other, and is inclined outwardly, and there is resulted in that the same is a common shelter plate 5 interposed between the respective air intake openings 4,4, which are provided in the upper and side surfaces, and the air pervious and water repellent membrane 2.

It is essential that each shelter plate 5 has the same width as the longer side of the air intake opening 4.

Alternatively, the shelter plate 5 may be so provided that the same is extended perpendicularly downwards from one side inner edge of the air intake opening 4 made in the upper surface of the protective covering lid 3 and is brought into contact, at its lower end, with the upper surface of the air pervious and water repellent membrane 2, but, in this case, part of the membrane 2 loses its air pervious property, and therefore it is better that the plate is so provided as in the foregoing example.

Figure 3:
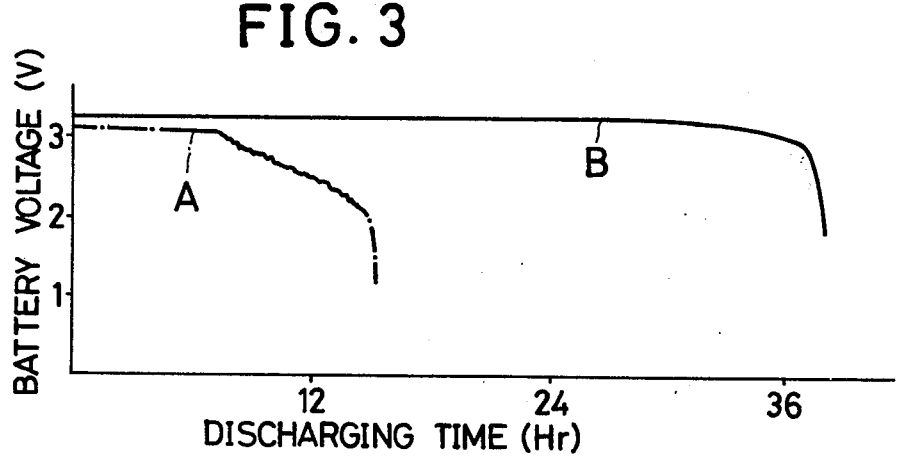
FIG. 3 is a diagram showing comparison of discharging characteristics.

Even when the metal-air battery thus constructed is used by being floated on the sea surface or fresh water surface, the such water or rain water or the like entered through the air intake openings 4 is prevented by the shelter plates 5,5 from entering the interior of the battery, and is discharged outside the battery from the air intake openings 4 made in the side surfaces of the protective covering lid 3, and accordingly the greater part of the membrane 2 is prevented from wetting. Thus, even in the case where it is used for a long period of time, the membrane 2 does not lose its air pervious property, and a good discharging characteristic of the battery can be assured. FIG. 3 shows a discharging characteristic of the metal-air battery according to this invention and that of a conventional metal-air battery having no shelter plate 5 under such a quasi-storm condition obtained by always pouring water on those batteries from the upper and side directions thereof.

As clear from the same Figure, it shows that the curve A obtained by the battery according to this invention is much longer in discharging hours than that B obtained by the conventional battery, and thereby it has been confirmed that the battery of this invention is superior in its discharging property. Thus, according to this invention, an air intake opening 4 is provided above an air pervious and repellent membrane 2 covering the upper surface of an air chamber 1, and a shelter plate 5 is provided between the air intake opening 4 and the air pervious and water repellent membrane 2, so that such advantages can be effected that the air pervious and water repellent membrane 2 is hardly spoiled by sea water and others in its air pervious property, and a good discharging characteristic of the battery can be assumed.

Figure 4:
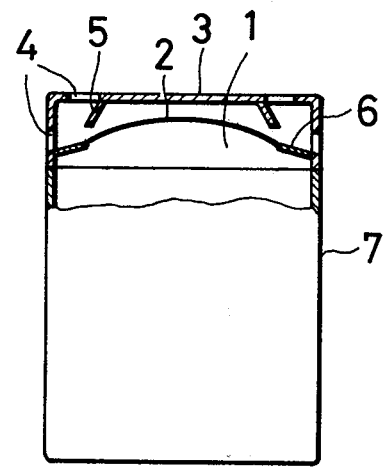
FIG. 4 is a sectional view of an essential portion of a modified example of this invention.

As shown in FIG. 4, the shelter plate 5 can be so modified that the same is projected from the protective covering lid 3 but does not reach the holding plate 6.

What is claimed is:

1. In a float type metal-air battery having an air pervious water repellent membrane defining a roof for an air chamber above the battery cells, the improvement comprising the combination of a lid enclosing said membrane, said lid having at least one opening, and an internal shelter plate interposed between said opening and said membrane, whereby at least a substantial portion of said membrane is protected from water incoming from outside through the opening.

2. In a float type metal-air battery having an air pervious water repellent membrane defining a dome-like roof for an air chamber above the battery cells, the improvement compriing the combination of a lid enclosing said membrane, said lid having vertically spaced openings, and internal protector plate means interposed between said openings and said membrane to channel water incoming from the higher of said openings out through the lower of said openings, whereby at least a substantial portion of said membrane is protected from such incoming water.

3. In a float type metal-air battery in accordance with claim 1 wherein said lid is generally U-shaped in cross-section.

4. In a float type metal-air battery in accordance with claim 2, wherein said lid includes a flat top wall section and a plurality of vertical side walls sections, downwardly extending from said top wall section, at least one of said openings being located in said top wall section, at least another one of said openings being located in one of said side wall sections, said protector plate means including at least one shelter plate extending along the inside edge of said one of said openings and downwardly from said top wall section toward said other of said openings and at least one support plate extending along the bottom edge of said another one of said openings and inwardly from said one of said side wall sections, said support plate having a free edge supportingly engaging said membrane.

5. In a float type metal-air battery in accordance with claim 4 wherein said shelter plate extends from said top wall section fully to said support plate.

* * * * *